(12) United States Patent
Gurubelli et al.

(10) Patent No.: US 12,578,931 B2
(45) Date of Patent: Mar. 17, 2026

(54) INTELLIGENT AND EFFICIENT PIPELINE MANAGEMENT

(71) Applicant: Harness Inc., San Francisco, CA (US)

(72) Inventors: Srinivasa Rao Gurubelli, Fremont, CA (US); Uri Scheiner, Pleasanton, CA (US); Lawrence Wilfred, San Francisco, CA (US)

(73) Assignee: Harness Inc, San Francisco, CA (US)

( * ) Notice: Subject to any disclaimer, the term of this patent is extended or adjusted under 35 U.S.C. 154(b) by 5 days.

(21) Appl. No.: 17/578,410

(22) Filed: Jan. 18, 2022

(65) Prior Publication Data

US 2023/0229402 A1    Jul. 20, 2023

(51) Int. Cl.
G06F 8/34        (2018.01)
G06F 11/3668        (2025.01)
G06F 11/3698        (2025.01)

(52) U.S. Cl.
CPC ............ G06F 8/34 (2013.01); G06F 11/3668 (2013.01); G06F 11/3698 (2025.01)

(58) Field of Classification Search
CPC ..... G06F 11/3664; G06F 11/3668; G06F 8/34
See application file for complete search history.

(56) References Cited

U.S. PATENT DOCUMENTS

| | | | |
|---|---|---|---|
| 8,677,315 B1* | 3/2014 | Anderson ........... | G06F 11/3668 717/124 |
| 11,416,379 B1* | 8/2022 | Petrescu ............. | G06F 11/3688 |
| 2005/0193266 A1* | 9/2005 | Subramanian ...... | G06F 11/3664 714/6.1 |
| 2010/0050158 A1* | 2/2010 | Daniel ................ | G06F 11/3664 717/125 |
| 2011/0214116 A1* | 9/2011 | Vidal ........................ | G06F 8/65 714/48 |
| 2014/0282434 A1* | 9/2014 | Eilam ................. | G06F 11/3688 717/124 |
| 2015/0026121 A1* | 1/2015 | Shani ................ | G06F 16/24578 707/748 |
| 2017/0269921 A1* | 9/2017 | Martin Vicente ... | G06F 11/3668 |
| 2018/0046453 A1* | 2/2018 | Nair .................... | G06F 11/3684 |
| 2019/0303271 A1* | 10/2019 | Vigneau .............. | G06F 11/3664 |
| 2022/0308903 A1* | 9/2022 | Chakraborty ............. | G06F 8/34 |
| 2023/0161596 A1* | 5/2023 | Vadapandeshwara .... | G06F 8/35 712/214 |

* cited by examiner

*Primary Examiner* — Ei Y Mui
*Assistant Examiner* — Brahim Bourzik

(57) ABSTRACT

A pipeline management system that allows for creating and managing pipelines and pipeline execution. The system allows a user to create pipeline stages, steps for the pipeline stages, and commands for the pipeline steps. The system efficiently allows users to create and manage multiple pipelines by allowing attributes of commands, such as for example variables in the commands, to be entered at runtime. The runtime entry attributes for a pipeline make up an input set. A pipeline can be bound with one or more input sets that are used to fill or instantiate the pipeline variables at runtime.

18 Claims, 15 Drawing Sheets

300

| Create a pipeline through a graphical interface | 310 |

| Create input sets for created pipeline | 320 |

| Execute created pipeline with input set | 330 |

| Create new input set | 340 |

310

320

Access environment data in pipeline graphical interface
510

Set environment data attribute to be received as runtime data
520

Access pipeline step data in pipeline graphical interface
530

Set pipeline step data attribute to be received as runtime data
540

Store created environment data attribute and pipeline step data as input set
550

330

340

INTELLIGENT AND EFFICIENT PIPELINE MANAGEMENT

BACKGROUND

Continuous integration of software involves integrating working copies of software into mainline software, in some cases several times a day. There are several aspects involved in a pipeline dedicated to integrating working copies of new software into fully executing mainline software. Creating a pipeline can be a difficult and tedious task, as each pipeline for introducing a software change into mainline software is different in some way. What is needed is an improved method for implementing pipelines for integrating new software into mainline software.

SUMMARY

The present technology, roughly described, provides a pipeline management system that allows for creating and managing pipelines and pipeline execution. The system allows a user to create pipeline stages, steps for the pipeline stages, and commands for the pipeline steps. The system efficiently allows users to create and manage multiple pipelines by allowing attributes of commands, such as for example variables in the commands, to be entered at runtime. The runtime entry attributes for a pipeline make up an input set. A pipeline can be bound with one or more input sets that are used to fill or instantiate the pipeline variables (e.g., attributes) at runtime.

New pipelines can be created efficiently using input sets and input set creation techniques. A pipeline created by the present system can have multiple variables and at least one input set, wherein the input set includes values that the pipeline can receive for certain variables at runtime. To create a new pipeline with different variable values at runtime, a new input set can be created, for example by modifying a previous input set, to modify the runtime variable values as needed. In this way, a set of similar pipelines with similar stages, steps, and commands, but needing different values for runtime variables, does not need to be created from scratch. Rather, the pipeline can by "modified" by creating a new input set. Further, the input set can be created form preexisting input sets already bound with the desired pipeline.

In some instances, the present technology provides a method for managing a pipeline for testing an application. The method begins by creating a graphical representation of a first pipeline provided in a graphical interface. One or more attributes of the first pipeline can be set to receive a value at runtime for the first pipeline. A selection of an input set is then received. The input set having data that corresponds to at least a subset of the one or more attributes, wherein the subset includes the one or more attributes to receive a value at runtime. The first pipeline with the input set is executed. The first pipeline attributes receive a value at runtime that corresponds to a value contained within the input set.

In some instances, a non-transitory computer readable storage medium includes embodied thereon a program, the program being executable by a processor to perform a method for managing a pipeline for testing an application. The method begins by creating a graphical representation of a first pipeline provided in a graphical interface. One or more attributes of the first pipeline can be set to receive a value at runtime for the first pipeline. A selection of an input set is then received. The input set having data that corresponds to at least a subset of the one or more attributes, wherein the subset includes the one or more attributes to receive a value at runtime. The first pipeline with the input set is executed. The first pipeline attributes receive a value at runtime that corresponds to a value contained within the input set.

In some instances, a system for automatically testing software code includes a server having a memory and a processor. One or more modules can be stored in the memory and executed by the processor to create a graphical representation of a first pipeline provided in a graphical interface, set one or more attributes of the first pipeline to receive a value at runtime for the first pipeline, receive a selection of an input set, the input set having data that corresponds to at least a subset of the one or more attributes, the subset including the one or more attributes to receive a value at runtime and execute the first pipeline with the input set, wherein the first pipeline attributes receiving a value at runtime receive a corresponding value contained within the input set.

DETAILED DESCRIPTION

Figure 1:
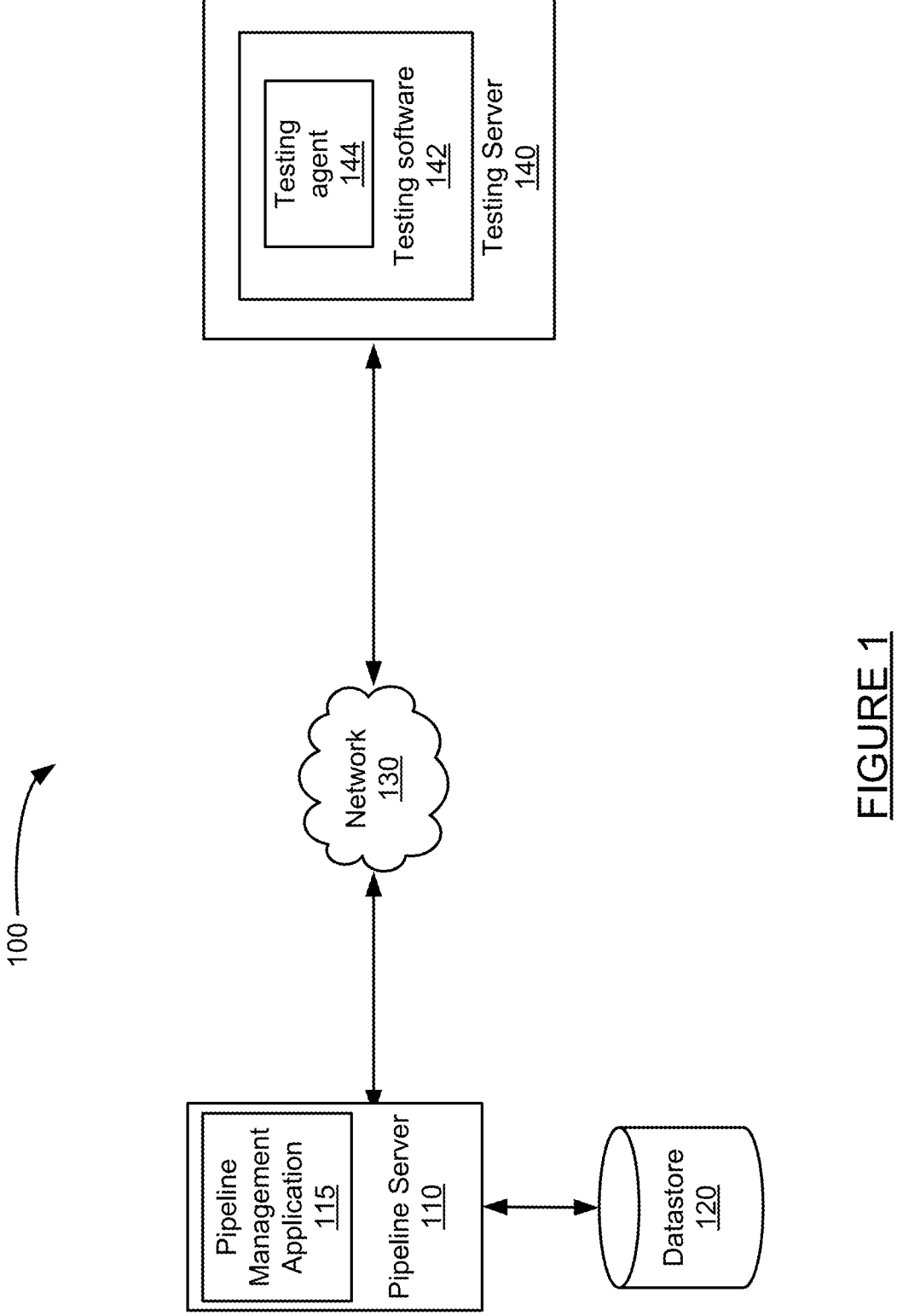
FIG. 1 is a block diagram of a system for managing a pipeline.

The present technology includes a pipeline management system that allows for creating and managing pipelines and pipeline execution. The system allows a user to create pipeline stages, steps for the pipeline stages, and commands for the pipeline steps. The system efficiently allows users to create and manage multiple pipelines by allowing attributes of commands, such as for example variables in the commands, to be entered at runtime. The runtime attributes for a particular pipeline make up an input set that is bound or associated with the pipeline. A pipeline can be bound with one or more input sets that are used to fill or instantiate the pipeline variables (e.g., attributes) for that pipeline at runtime.

New pipelines can be created efficiently using input sets and input set creation techniques. A pipeline created by the present system can have multiple variables and at least one input set, wherein the input set includes values that the pipeline can receive for certain variables at runtime. To create a new pipeline with different variable values at runtime, a new input set can be created, for example by modifying a previous input set, to modify the runtime variable values as needed. In this way, a set of similar pipelines with similar stages, steps, and commands, but needing different values for runtime variables, does not need to be created from scratch. Rather, the existing pipeline can by created or "modified" by creating a new input set. Further, the input set can be created from preexisting input sets already bound with the desired pipeline.

The present system addresses a technical problem of efficiently managing a pipeline creation process by streamlining the process to create new pipelines with different variables and variable values. The problem with current pipeline generation systems is that they waste computing resources and cycles and valuable memory space to create new pipelines. A typical software application can be updated several times per day dozens of times per week. Each part of updated code must be tested through different pipeline stages. The pipeline stages, steps, and commands can take up valuable memory space, and take considerable engineer time and computing resources to create.

The present system provides a technical solution to the technical problem of efficiently managing a pipeline creation process by reducing the processing cycles and memory required to create new pipelines and manage such pipelines. The solution disclosed herein allows variables within a pipeline command to be set as a runtime variable. The values for a set of pipeline variables to be received at runtime are contained in an input set. A pipeline can have one or more input sets, and an input set may be coupled or bound to more than one pipeline. When a new pipeline is created, and if there is a pipeline that is similar to the existing pipeline but with variables that need to be changed, then only the input set need to be changed. Similarly, if a pipeline needs modifications to a stage, steps, or commands, the changes can be made from an existing pipeline and the input sets of the previous pipeline can be modified to efficiently instantiate the new pipeline.

FIG. 1 is a block diagram of a system for managing a pipeline. System 100 of FIG. 1 includes pipeline server 110, data store 120, network 130, testing server 140, and applications 150-160 within environment 170. Pipeline server 110, testing server 140, and applications within environment 170 may all communicate directly or indirectly with each other over network 130.

Network 130 may be implemented by one or more networks suitable for communication between electronic devices, including but not limited to a local area network, wide-area networks, private networks, public network, wired network, a wireless network, a Wi-Fi network, an intranet, the Internet, a cellular network, a plain old telephone service, and any combination of these networks.

Pipeline server 110 may include pipeline management application 115. Pipeline management application 115 may efficiently create pipelines that utilize input sets to provide runtime variable values. By using the input sets, variations of pipelines can be created quickly and efficiently. Application 115 may provide a graphical interface, for example an interactive dashboard, to allow users to interactively create pipelines. More details for pipeline management application 115 are discussed with respect to FIG. 2.

Data store 120 receive, store, edit, add, and delete pipeline and other data as used by the servers and applications in the presently disclosed system.

Testing server 140 may include testing software 142. Testing software 142 tests software that is under development. The testing software can test the software under development in steps. For example, the testing software may test a first portion of the software using a first step, and so on with additional steps through an nth step.

A testing agent 144 may execute within or in communication with the testing software 120. The testing agent may control testing for a particular stage or type of testing for the software being developed. In some instances, the testing agent may detect the start of the particular testing, and initiate a process to identify which tests of a test plan to execute in place of every test in the test plan. The testing agents may detect events and intercept data, determine the stage of a pipeline being executed, and report back to pipeline server 110.

Figure 2:
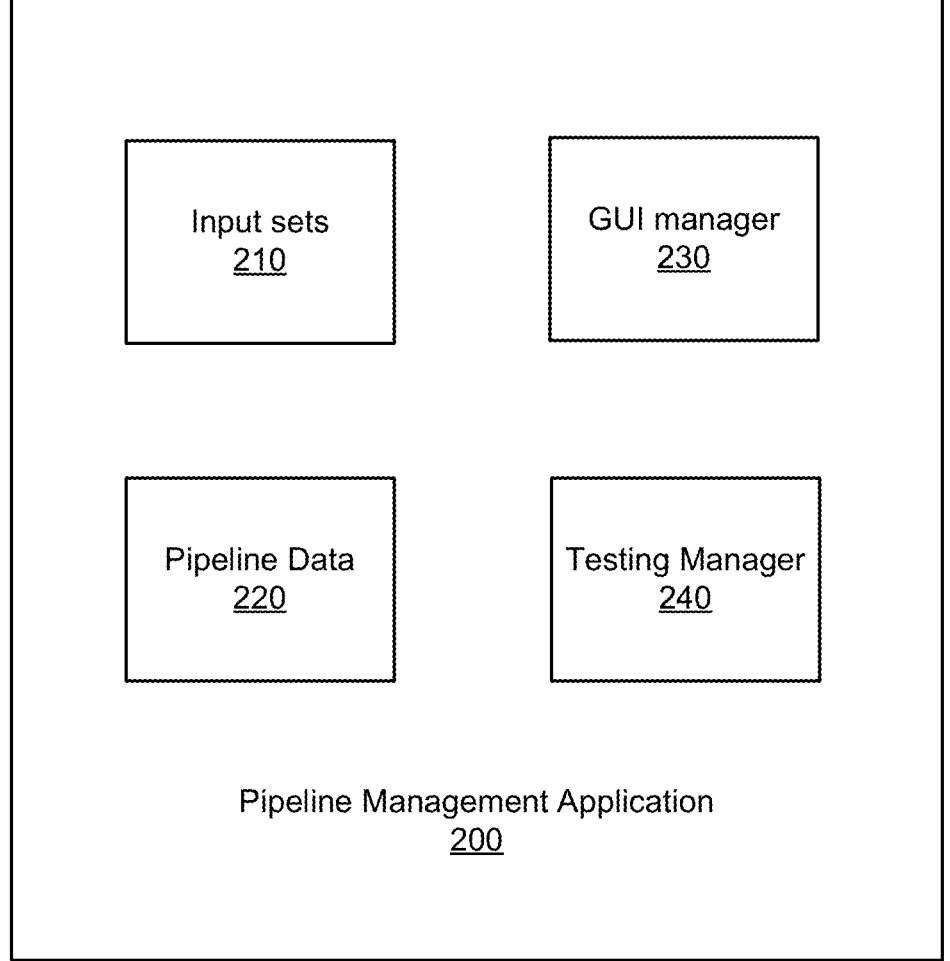
FIG. 2 is a block diagram of a pipeline management application.

FIG. 2 is a block diagram of a pipeline management application. Application 200 of FIG. 2 provides more detail of pipeline management application 115 of FIG. 1. Pipeline management application 200 includes input sets 210, pipeline data 220, graphical user interface manager 230, and testing manager 240. Input sets 210 may include data that can be bound or associated with a particular pipeline. The input sets include data that may instantiate runtime pipeline variables when the pipelines are executed. Each input set may be associated with one or more pipelines, and one or more pipelines may be coupled to an input set.

Pipeline data 220 may be used to create a pipeline graphically or logically through a graphical interface, along with other code and components used to execute a pipeline for code testing. Pipeline data 220 may include pipeline stage data, pipeline step data, one or more commands for one or more pipeline steps, and variables and other data associated with the steps. The pipeline data may include data from multiple pipelines, and may be stored locally on pipeline management application or remotely, such as for example in data store 120.

GUI manager 230 may create, instantiate, receive input through, update, and otherwise manage a graphical user interface for creating, editing, and managing a pipeline for testing and updating applications. The GUI manager 230, in some instances, may implement an interactive user interface that a user may create and modify. In some instances, the graphical user interface, which can be implemented as a dashboard, may be used to create pipeline data components, such as stages, steps, commands, and variables, as well as create input sets to be utilized by a particular pipeline at runtime.

Testing manager 240 may execute a particular pipeline. The testing manager may access a pipeline, as well as the pipeline stages, steps, and data, initiate runtime for the pipeline, instantiate a selected input set for the pipeline at runtime to provide values for pipeline runtime variables, and then execute pipeline stages and steps.

Pipeline management application 200 may include the functionality discussed with respect to FIG. 2 as well as additional functionality discussed herein. In some instances, one or more modules 210-240 may be implemented as combined or additional modules, and may be implemented locally on server 110, distributed over several servers, or even formed on testing server or environment 170.

Figure 3:
FIG. 3 is a method for managing a pipeline.
Figure 3:
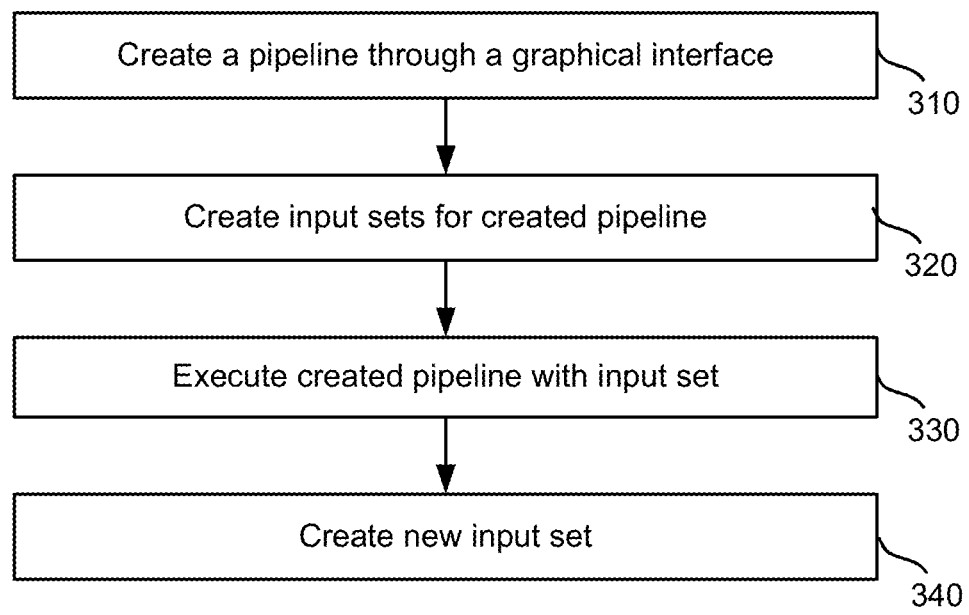
Figure 8:
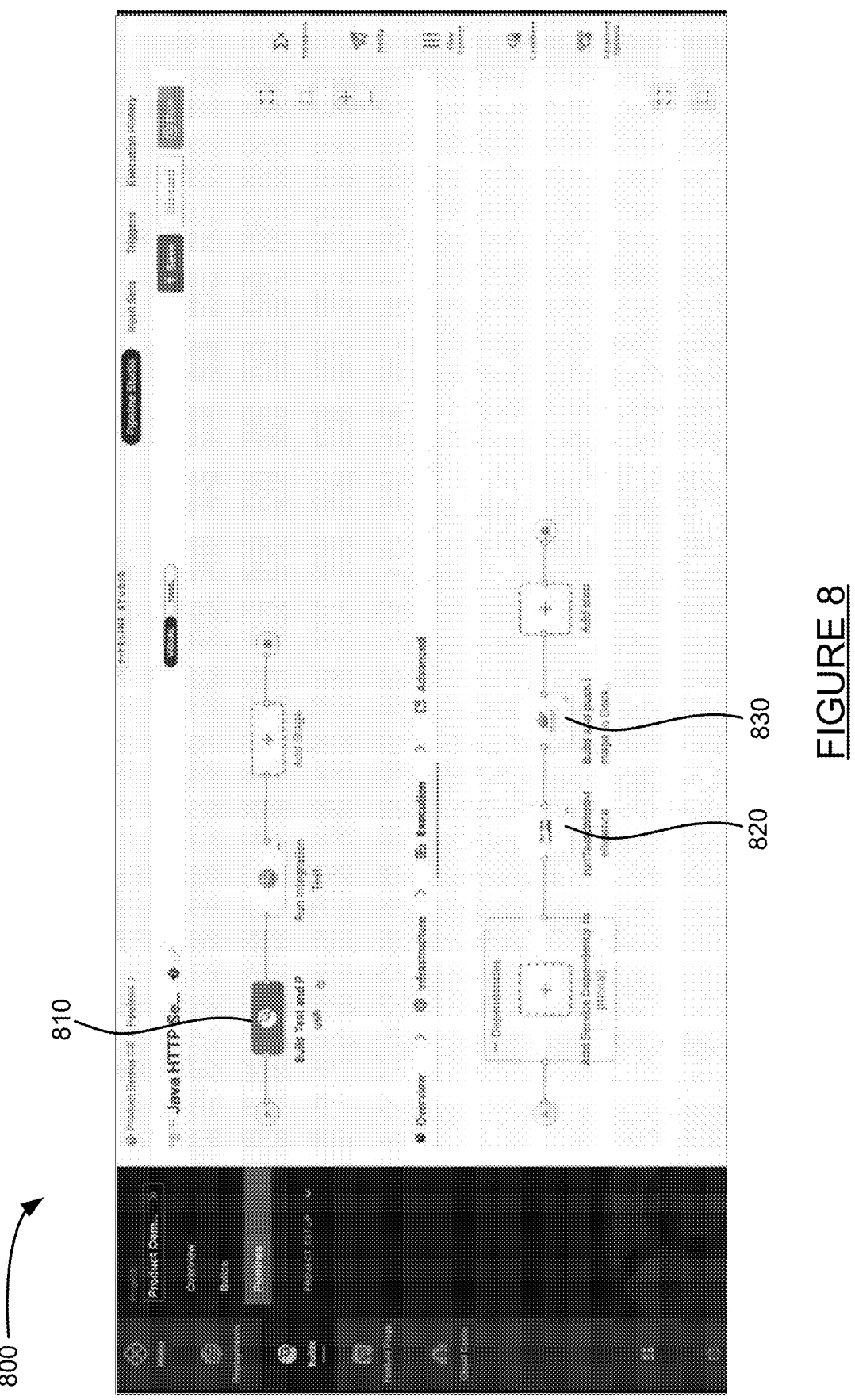
FIG. 8 is a screenshot of a graphical interface for managing a pipeline.
Figure 9:
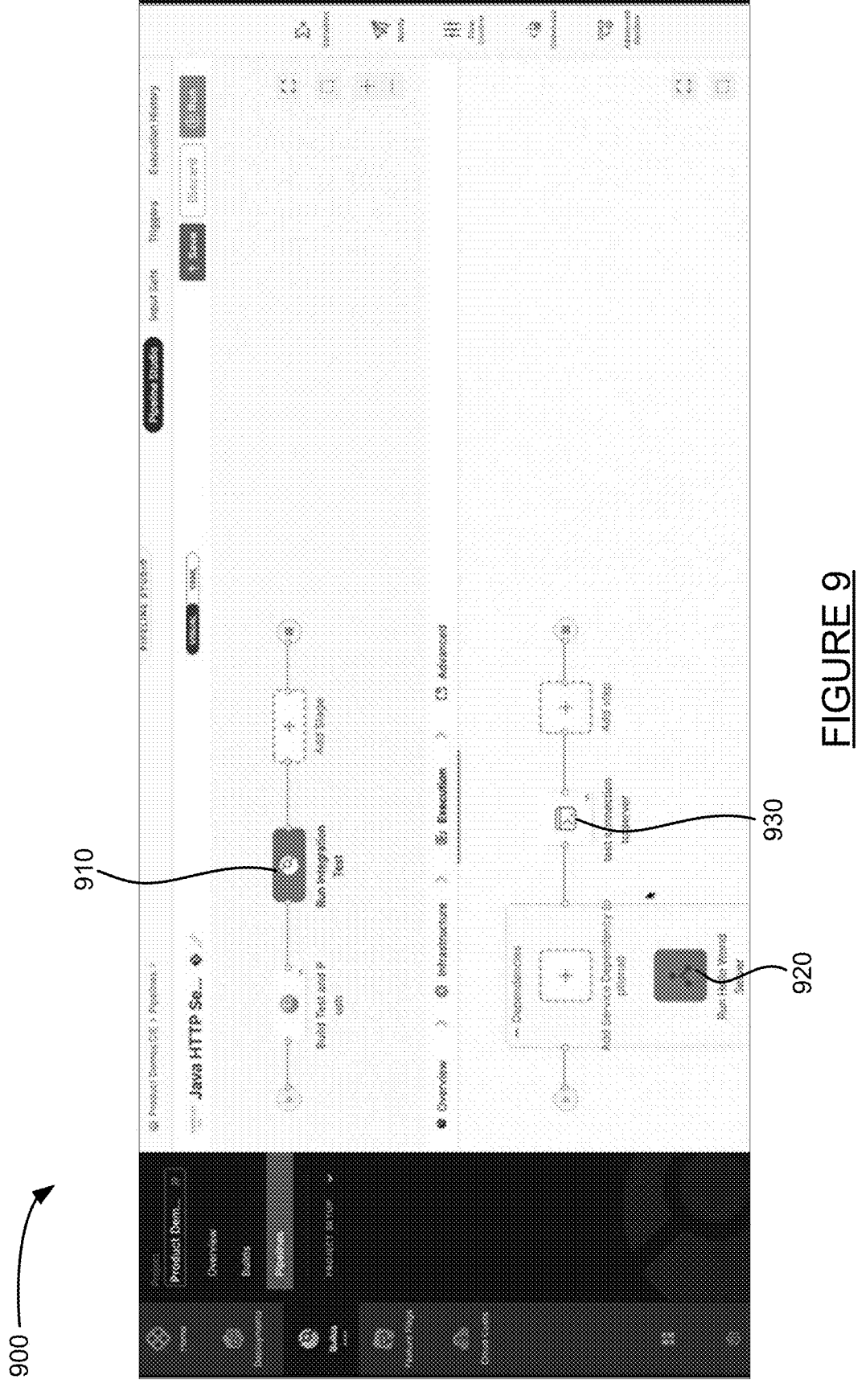
FIG. 9 is a screenshot of another graphical interface for managing a pipeline.

FIG. 3 is a method for managing a pipeline. First, a pipeline is created through a graphical interface at step 310. Creating a pipeline through a graphical interface, for example a dashboard, may include creating pipeline stages, steps for each of the one or more stages, and commands for each of the one or more steps. A user may create a pipeline using graphical elements or icons for each stage, step, and command. An example of a created pipeline is illustrated in FIGS. 8 and 9, and discussed in more detail with respect to the method of FIG. 4.

Input sets are created for a pipeline at step 320. The input sets may be created as values for data that is to be instantiated into pipeline commands at runtime. A dashboard for creating input sets is illustrated with respect to FIGS. 10 and 11. Creating input sets is discussed in more detail with respect to the method of FIG. 5.

Created pipelines are executed with input sets at step 330. Executing a created pipeline involves initiating execution, instantiate the pipeline with one or more associate input sets, and managing the execution of the pipeline by the pipeline application. A dashboard that illustrates executing a pipeline with an input set is discussed with respect to FIG. 12. More details for executing a created pipeline with an input set is discussed with respect to the method of FIG. 6.

A new input set is created at step 340. In some instances, new input sets can be created efficiently and quickly based on existing input sets that are modified through a graphical interface provided by the present application. Creating a new input set through a graphical interface is discussed with respect to the graphical interface of FIGS. 13 and 14. More details for creating a new input set are discussed with respect to the method of FIG. 7.

Figure 4:
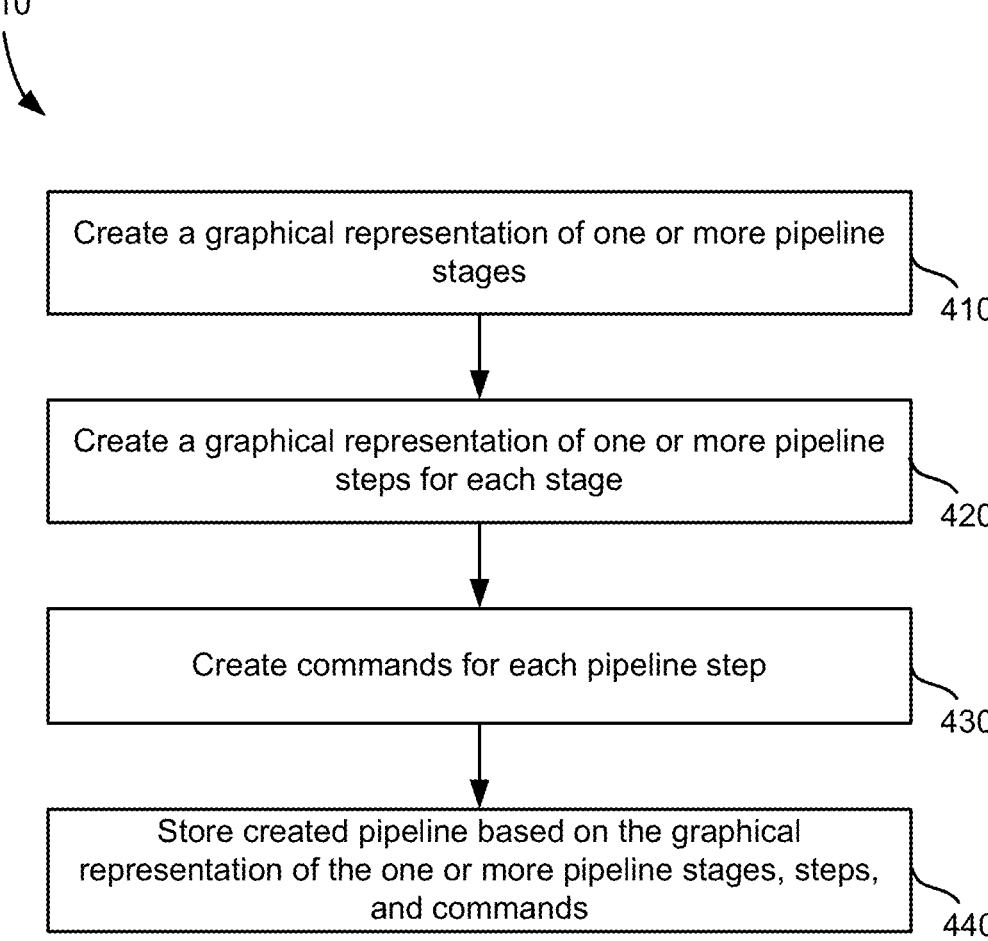
FIG. 4 is a method for creating a pipeline through a graphical interface.

FIG. 4 is a method for creating a pipeline through a graphical interface. The method of FIG. 4 provides more detail of step 310 the method of FIG. 3. A graphical representation of one or more pipeline stages is created through a graphical interface at step 410. A graphical representation of one or more pipeline steps for each created stage is created at step 420. In some instances, each pipeline is created to modify or test code and may include one or more stages, as well as one or more steps for each stage.

Commands can be created for each pipeline step at step 430. Each step may include one or more commands to be executed for the particular step. The created pipeline is then stored at step 440. The created pipeline may be based on the graphical representation of the one or more pipeline stages, steps, and commands.

Figure 5:
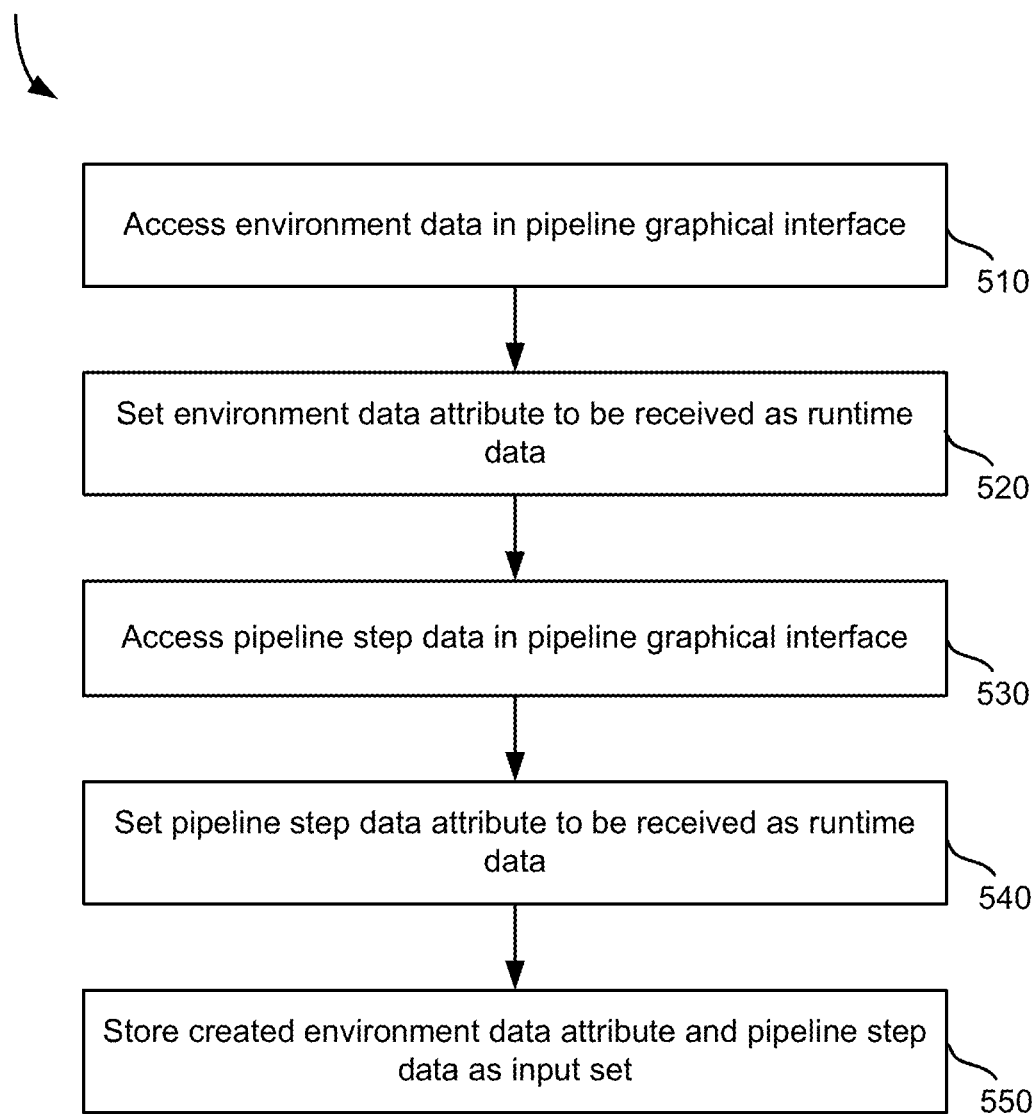
FIG. 5 is a method for creating input sets for a created pipeline.

FIG. 5 is a method for creating input sets for a created pipeline. The method of FIG. 5 provides more detail for step 320 the method of FIG. 3. Environment data is accessed in the pipeline graphical interface at step 510. Environment data attributes may be set to be received as runtime data at step 520. Pipeline step data may be accessed in the pipeline graphical interface at step 530. The access pipeline data attributes may then be set to be received as runtime data at step 540. The created environment data attributes and pipeline step data attributes can be stored as an input set at step 550. Upon execution of the pipeline, the pipeline management application will access associated input sets, instantiate pipeline commands with parameters and/or attributes from the input set, and proceed to execute the pipeline.

Figure 6:
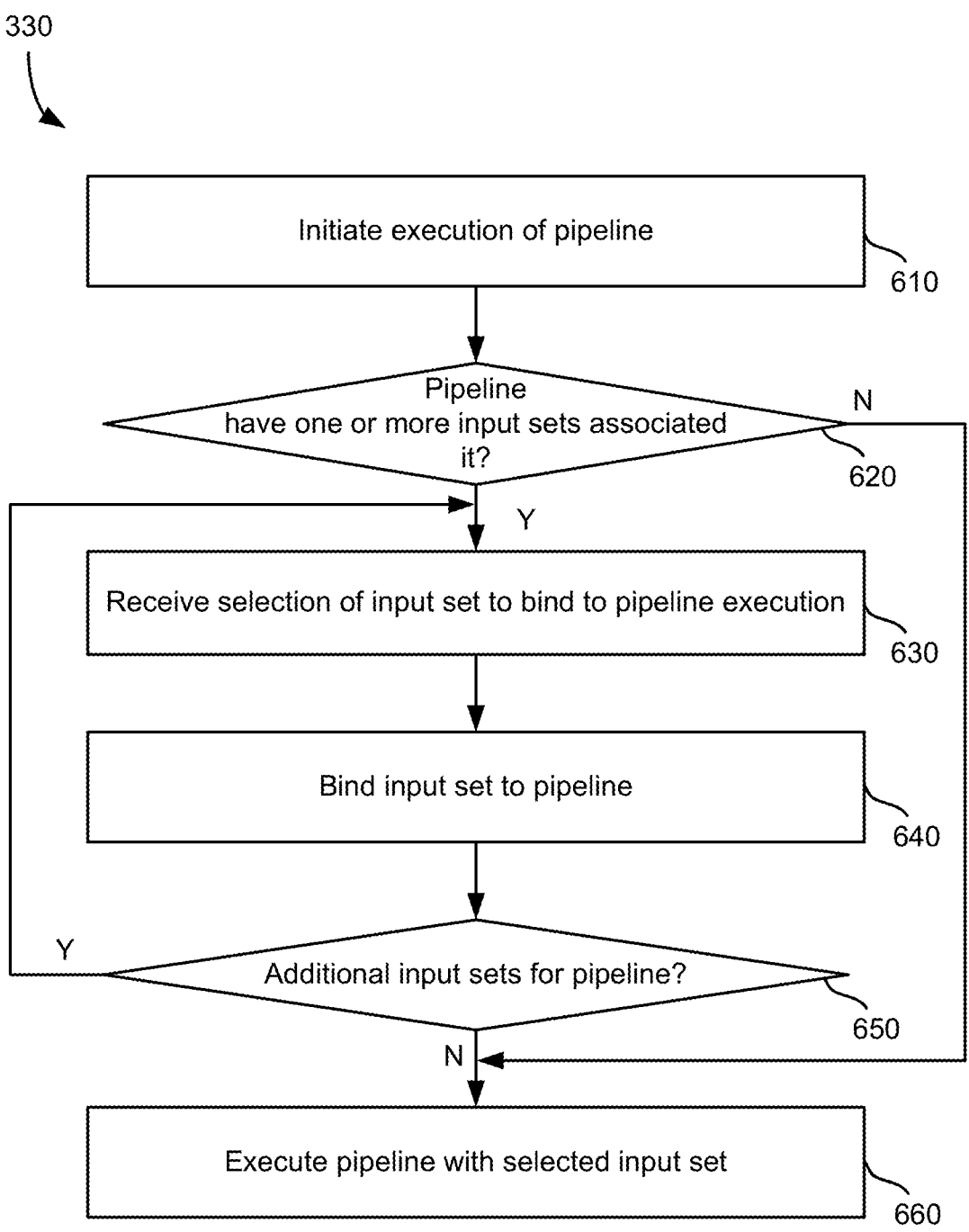
FIG. 6 is a method for executing a created pipeline with an input set.

FIG. 6 is a method for executing a created pipeline with an input set. The method of FIG. 6 provides more detail for step 330 of the method of FIG. 3. First, execution of a pipeline is initiated at step 610. A determination is then made as to whether the pipeline has one or more input sets associated with it at step 620. If the pipeline does not have any input sets associated with or bound to it, the method of FIG. 6 continues to step 660. An input set may be bound to a pipeline if the pipeline has meta data that specifies an input set identifier, and/or if the input set includes meta data that includes a pipeline identifier.

If the pipeline does have one or more input sets associated with it, the method continues to step 630 where a selection of an input set is received at step 630. The input set received is to be bound to the pipeline execution, such that when the pipeline is executed at runtime, the selected input sets will be used to instantiate the pipeline runtime variables. The input set is bound to the pipeline at step 640. In some instances, binding the input sets the pipeline include storing the input set with an identifier for the particular created pipeline. A determination is made as whether additional input sets exist for the pipeline at step 650. If additional inputs exist, a selection of an input set to bind to the pipeline is received at step 630. If there are no additional input sets for the pipeline, the pipeline is executed with the selected input set at step 660.

Figure 7:
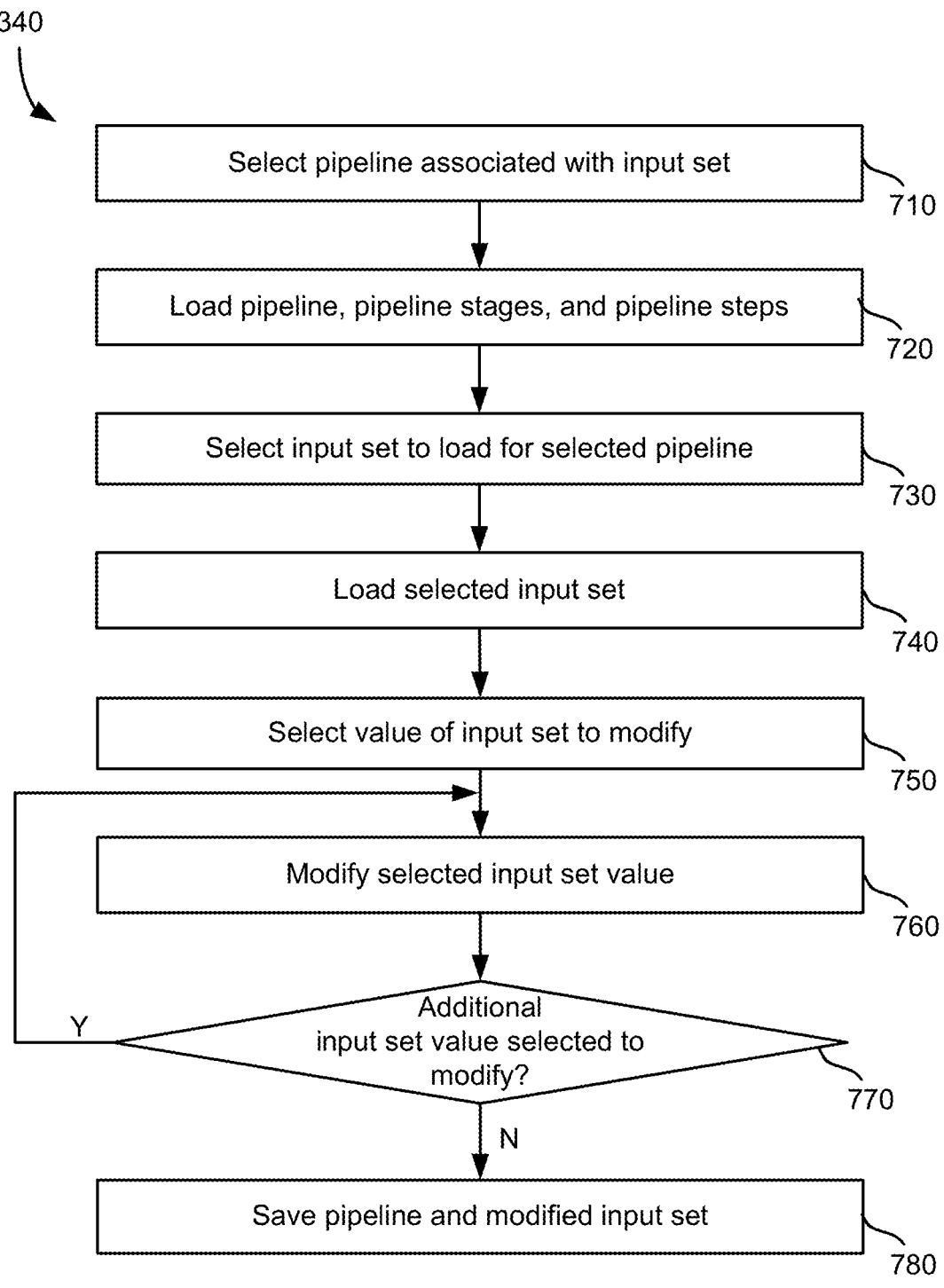
FIG. 7 is a method creating a new input set for a pipeline.

FIG. 7 is a method for creating a new input set for a pipeline. The method of FIG. 7 provides more detail for step 340 of the method of FIG. 3. A selection of a pipeline associated with an input set is received at step 710. The pipeline, pipeline stages, and pipeline steps are then loaded at step 720. An input set to load for the selected pipeline is selected at step 730. In some instances, input is received through a graphical interface from a user and by the application which selects the input set.

A selection may be received for a value of an input set to modify at step 750. The selected input set value is then modified at step 760. A determination is then made as to whether additional inputs had values are selected to modify at step 770. If additional inputs had values have been selected for modification, the selected input said values are modified at step 760 and the method continues to step 770. If no additional inputs had values are selected to modify, the pipeline and the modified inputs are saved at step 780.

FIG. 8 is a screenshot of a graphical interface for managing a pipeline. The graphical interface 800 of FIG. 8 illustrates the creation of a pipeline. In particular, a pipeline has a first stage labeled "build test and push" and a second stage labeled "run integration test." The first stage 820 has two steps. A first step is labeled "run test with intelligence." The second step 830 for stage 810 is labeled "build and push image to dock." As shown in the lower part of the interface on either side of steps 820 and 830, a user may add a service dependency before stage 820 and at a step after step 830.

FIG. 9 is a screenshot of another graphical interface for managing a pipeline. In interface 900 of FIG. 9, the second state 910 includes a step of "test connection to server.". A service dependency 920 is implemented before step 930, and is labeled "run hello world server." As shown in the lower part of the interface, a user may add a service dependency before dependency 920 and may add a step after step 930.

Figure 10:
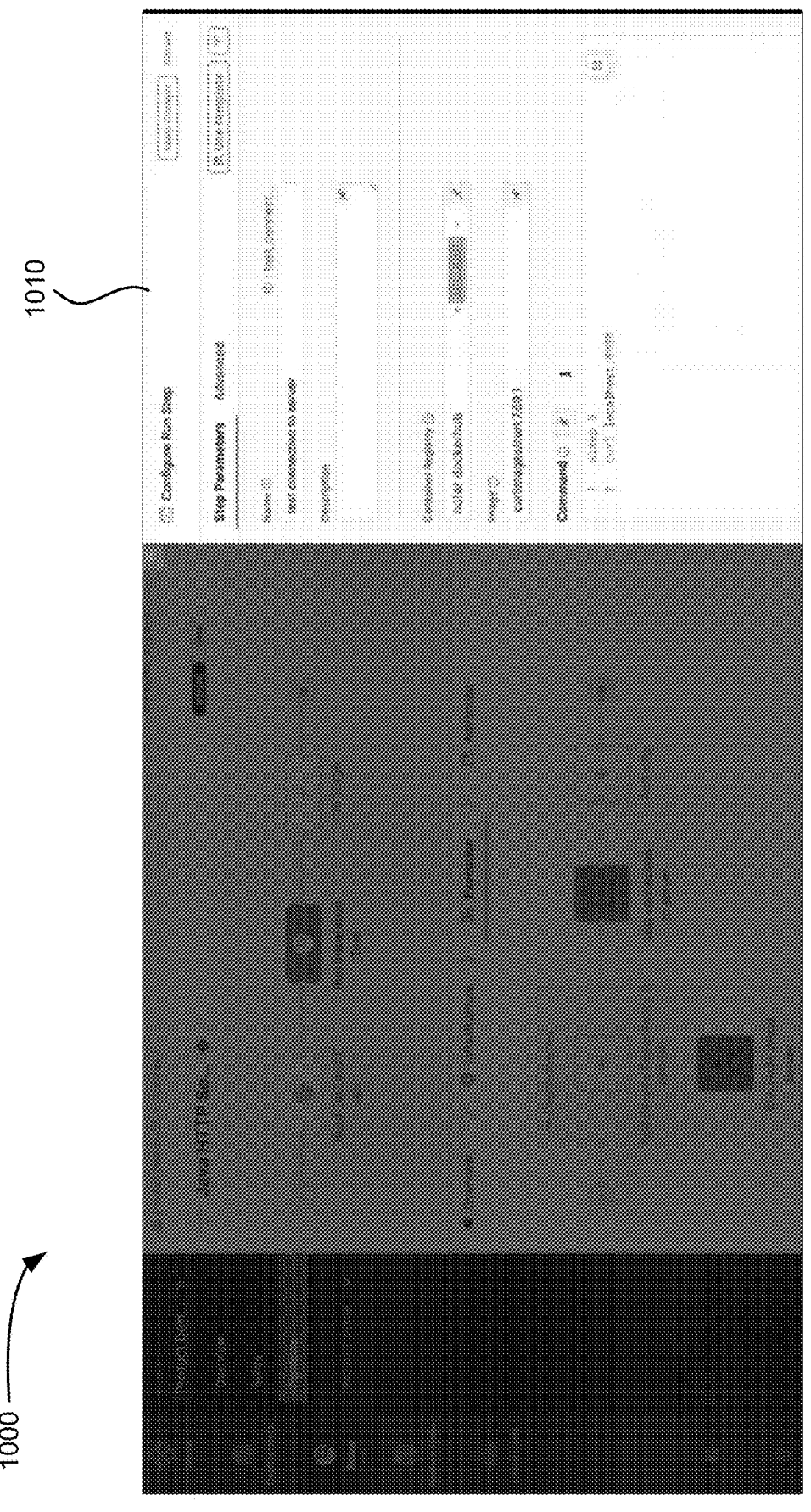
FIG. 10 is a screenshot of a graphical interface for configuring input as a runtime value.

FIG. 10 is a screenshot of a graphical interface for configuring input as a runtime value. In interface 1000 of FIG. 10, a menu 1010 is provided to configure a run step. The menu includes tabs of "step parameters" and "advanced." Under the "step parameters" tab, a user may enter a name of the pipeline, description, a container registry name, image, and commands. A user may also elect to use a template in this instantiate the template.

Figure 11:
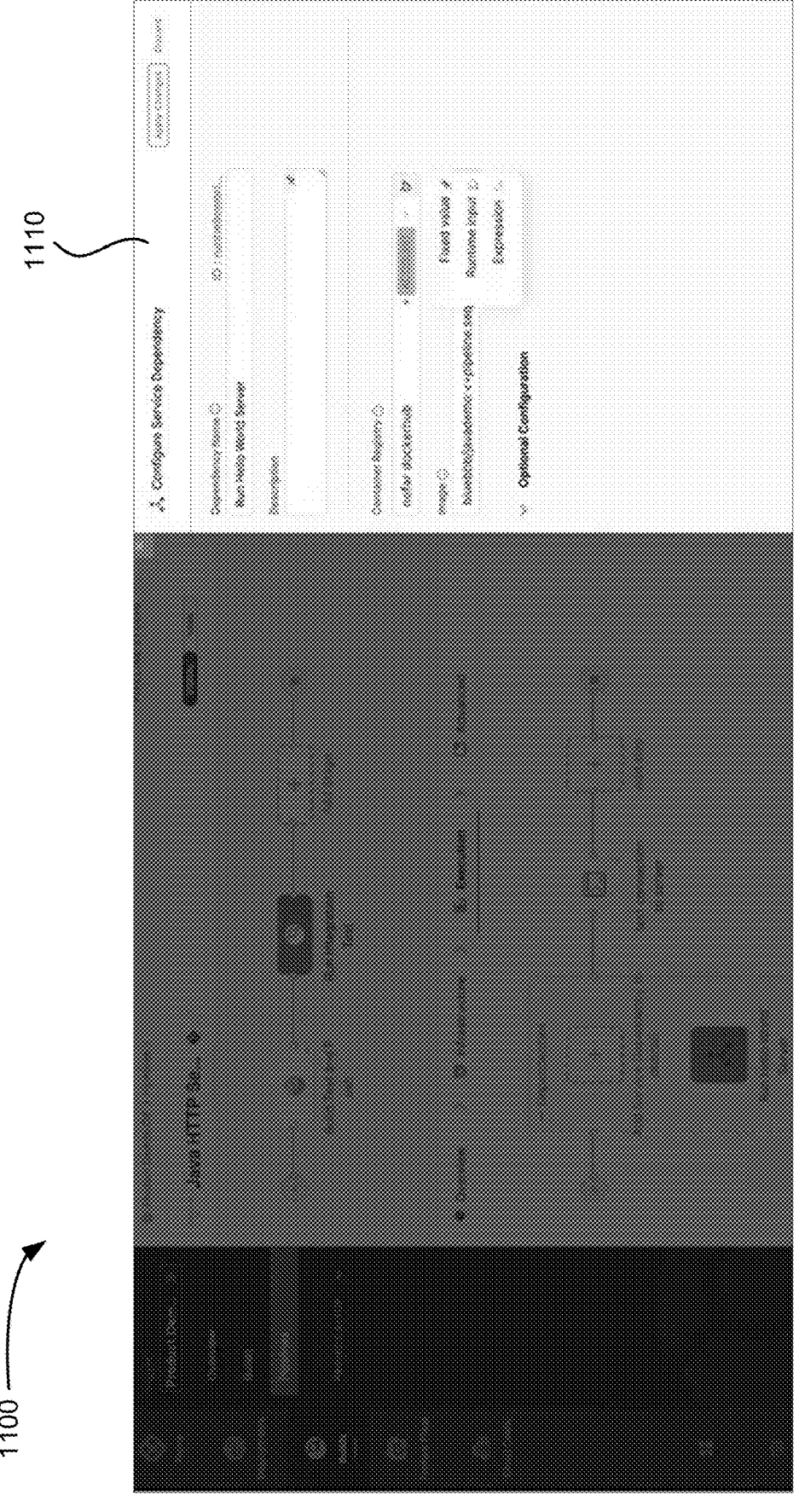
FIG. 11 is a screenshot of a graphical interface for configuring a registry as a runtime value.

FIG. 11 is a screenshot of a graphical interface for configuring a registry as a runtime value. The interface 1100 of FIG. 11 provides a menu 1110 to configure a service dependency. Within menu 1110, the interface can receive information for dependency name, description, container registry, image, and other data. As shown for the container registry selection, the user can provide input to keep the registry a fixed value for the pipeline, make the value a runtime input, or make the value an expression. When selected as a runtime input, the container registry is instantiated from an input that is unpacked and applied to the pipeline at runtime.

Figure 12:
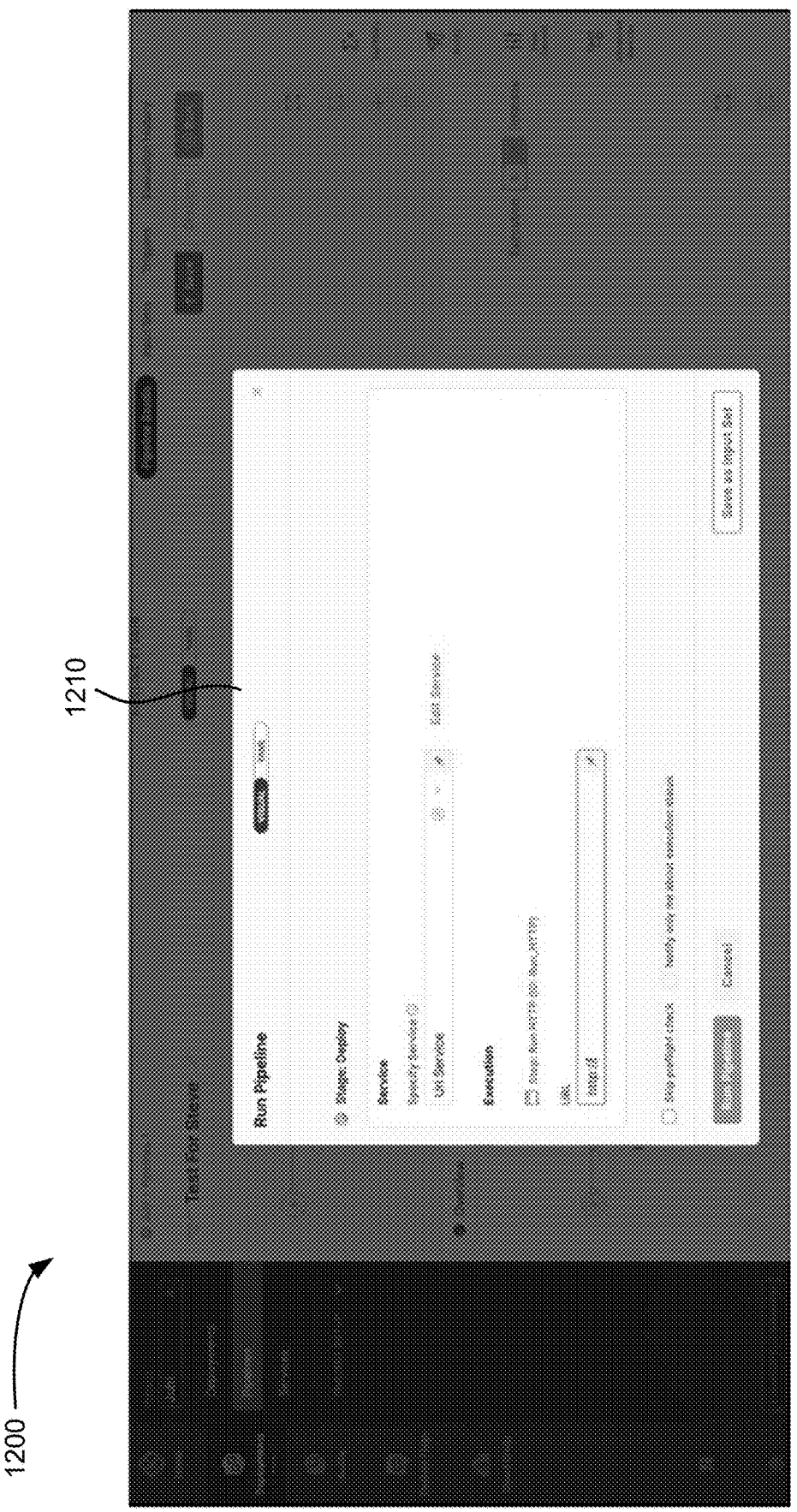
FIG. 12 is a screenshot of a graphical interface for receiving input set values at runtime.

FIG. 12 is a screenshot of a graphical interface for receiving input set values at runtime. Interface 1200 of FIG. 12 provides a menu 1210 for running a pipeline. Within the menu 1210, input fields for a deploy stage are illustrated. Within the deploy stage, a user may specify a service and an execution URL. The service and the URL may be designated as static variables, or set as runtime variables to form an input set.

Figure 13:
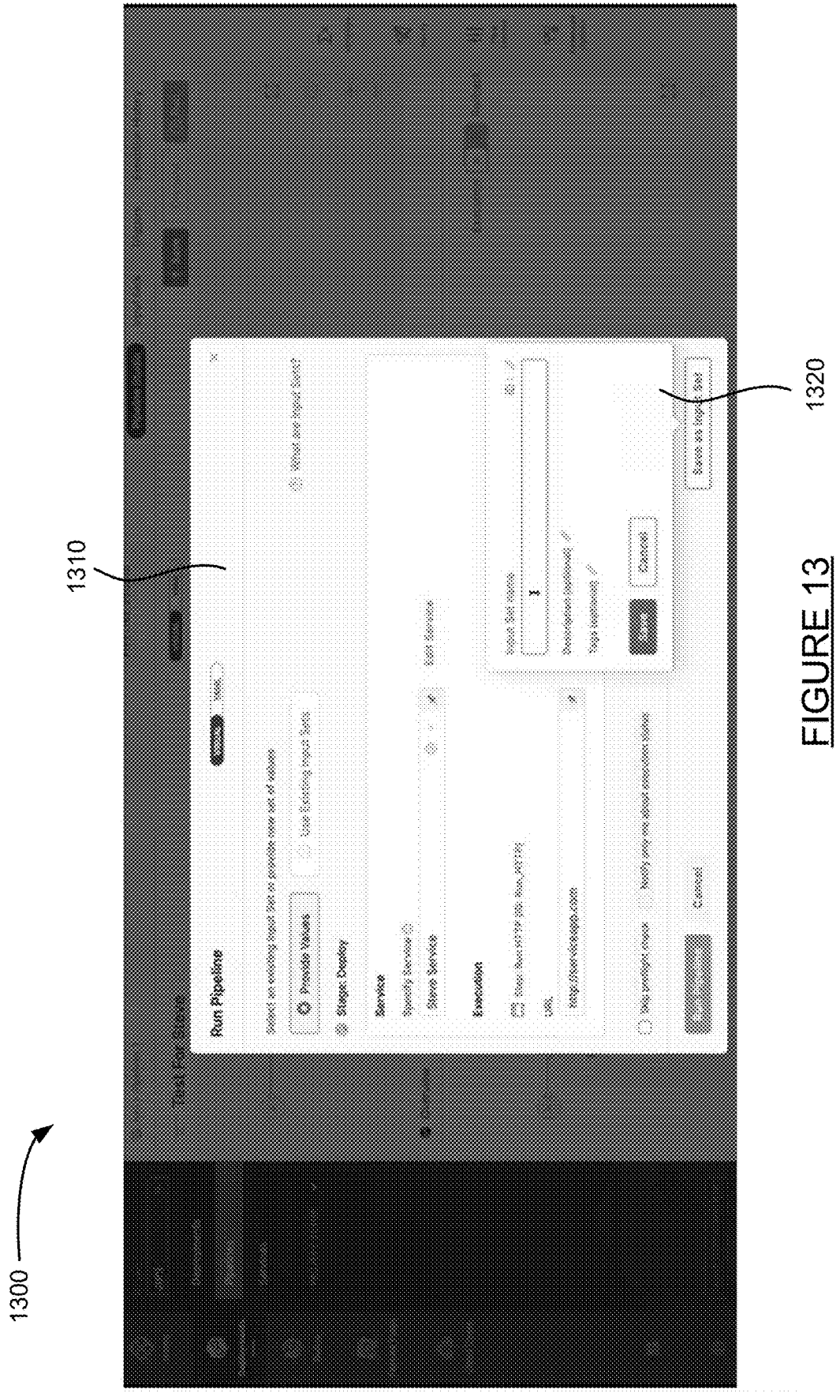
FIG. 13 is a screenshot of a graphical interface for receiving and saving an input set.

FIG. 13 is a screenshot of a graphical interface for receiving and saving an input set. Interface 1300 of FIG. 13 provides an interface 1310 for executing a pipeline. The interface allows a user to select an input set or provide a new set of values for the selected pipeline. Within the interface 1310, a button for "providing values" is selected, and values are accordingly received for a service and execution. Within menu 1310, a user may provide the entered data as an input set, including the input set name, description, and tags.

Figure 14:
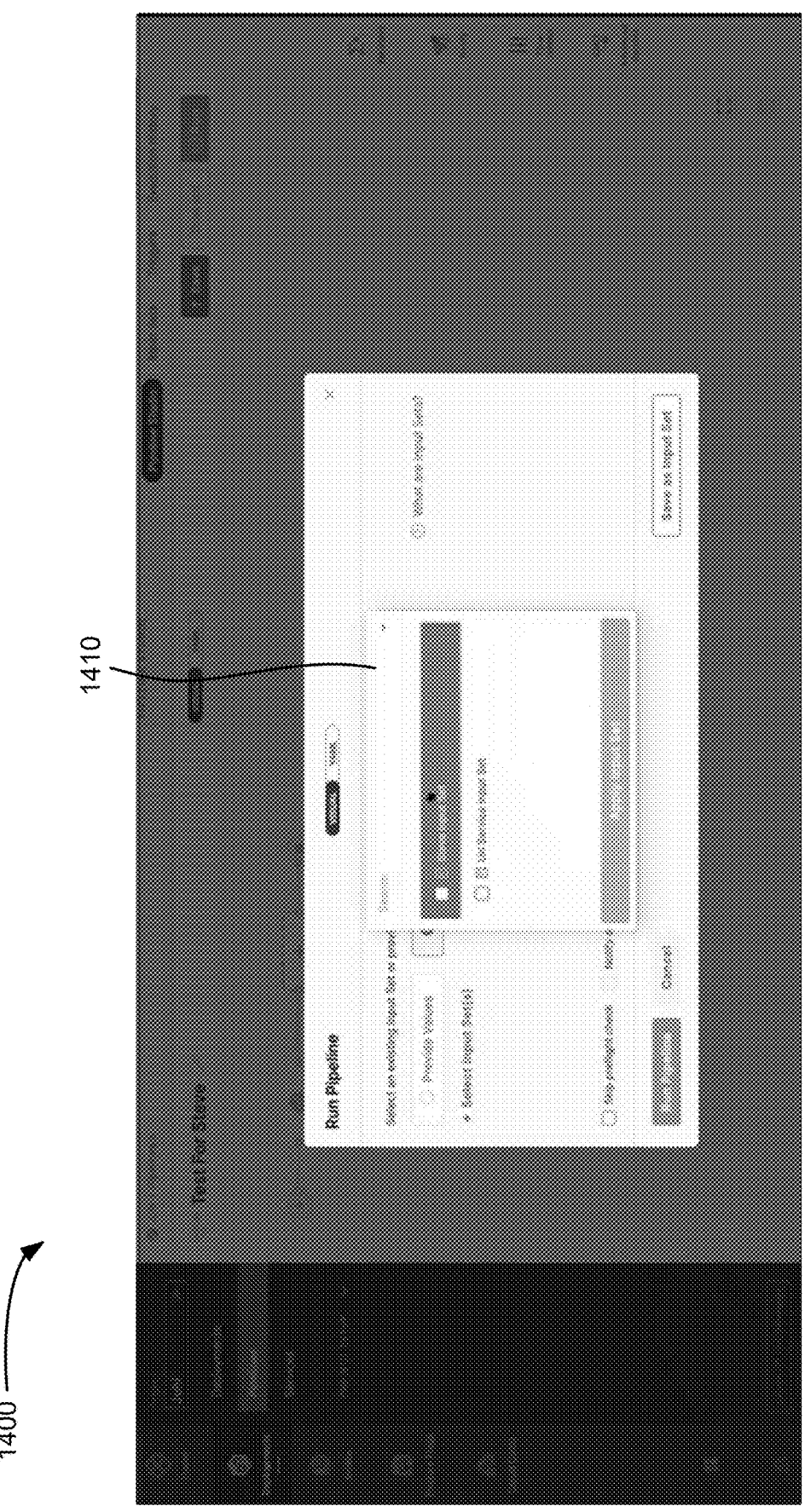
FIG. 14 is a screenshot of a graphical interface for receiving a selection of an input set to use for a pipeline at runtime.

FIG. 14 is a screenshot of a graphical interface for receiving a selection of an input set to use for a pipeline at runtime. Interface 1400 of FIG. 14 allows a user to search for input sets to bind with the pipeline at runtime. Menu 1410 within interface 1400 reveals inputs sets that can be selected. Upon selection, the input set is applied to the runtime variables of the selected pipeline in the pipeline runtime execution continues.

Figure 15:
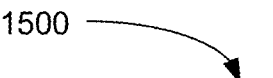
FIG. 15 is a block diagram of a computing environment for implementing the present technology.
Figure 15:
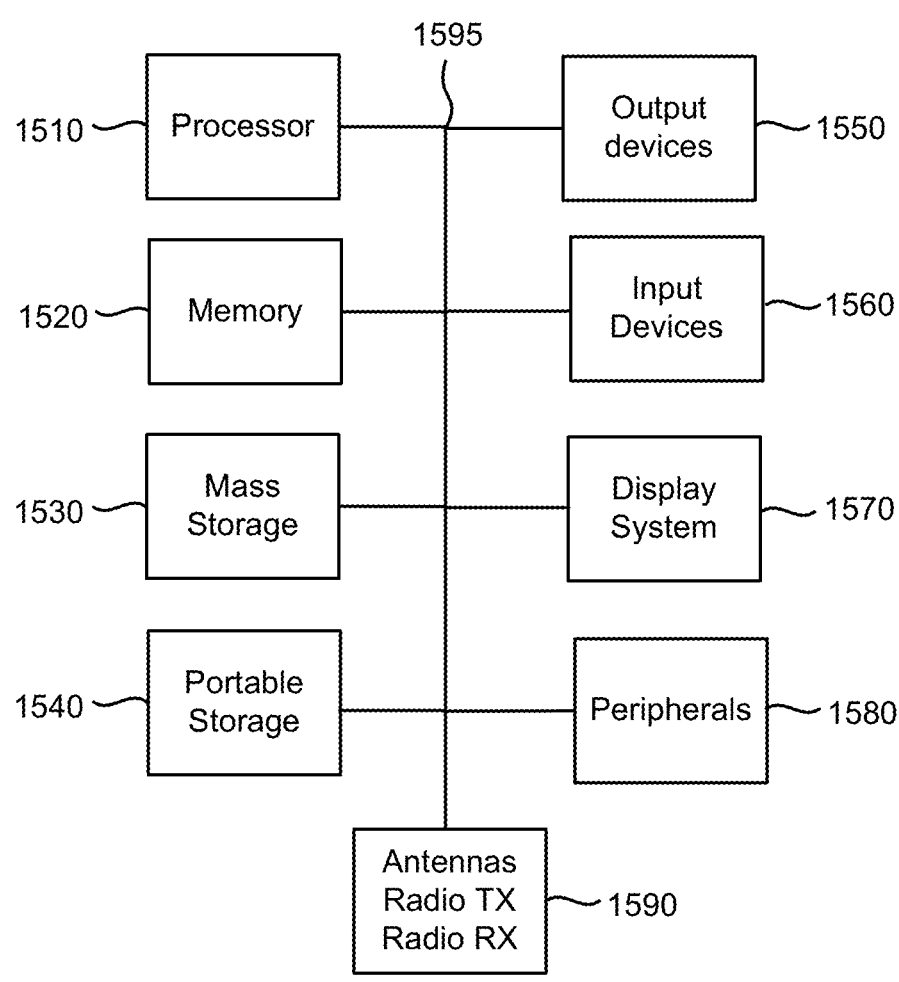

FIG. 15 is a block diagram of a computing environment for implementing the present technology. System 1500 of FIG. 15 may be implemented in the contexts of the likes of machines that implement testing server 150, intelligence server 150, and data store 160. The computing system 1500 of FIG. 15 includes one or more processors 1510 and memory 1520. Main memory 1520 stores, in part, instructions and data for execution by processor 1510. Main memory 1520 can store the executable code when in operation. The system 1500 of FIG. 15 further includes a mass storage device 1530, portable storage medium drive(s) 1540, output devices 1550, user input devices 1560, a graphics display 1570, and peripheral devices 1580.

The components shown in FIG. 15 are depicted as being connected via a single bus 1590. However, the components may be connected through one or more data transport means. For example, processor unit 1510 and main memory 1520 may be connected via a local microprocessor bus, and the mass storage device 1530, peripheral device(s) 1580, portable storage device 1540, and display system 1570 may be connected via one or more input/output (I/O) buses.

Mass storage device 1530, which may be implemented with a magnetic disk drive, an optical disk drive, a flash drive, or other device, is a non-volatile storage device for storing data and instructions for use by processor unit 1510. Mass storage device 1530 can store the system software for implementing embodiments of the present invention for purposes of loading that software into main memory 1520.

Portable storage device 1540 operates in conjunction with a portable non-volatile storage medium, such as a floppy disk, compact disk or Digital video disc, USB drive, memory card or stick, or other portable or removable memory, to input and output data and code to and from the computer system 1500 of FIG. 15. The system software for implementing embodiments of the present invention may be stored on such a portable medium and input to the computer system 1500 via the portable storage device 1540.

Input devices 1560 provide a portion of a user interface. Input devices 1560 may include an alpha-numeric keypad, such as a keyboard, for inputting alpha-numeric and other information, a pointing device such as a mouse, a trackball, stylus, cursor direction keys, microphone, touch-screen, accelerometer, and other input devices. Additionally, the system 1500 as shown in FIG. 15 includes output devices 1550. Examples of suitable output devices include speakers, printers, network interfaces, and monitors.

Display system 1570 may include a liquid crystal display (LCD) or other suitable display device. Display system 1570 receives textual and graphical information and processes the information for output to the display device. Display system 1570 may also receive input as a touch-screen.

Peripherals 1580 may include any type of computer support device to add additional functionality to the computer system. For example, peripheral device(s) 1580 may include a modem or a router, printer, and other device.

The system of 1500 may also include, in some implementations, antennas, radio transmitters and radio receivers 1590. The antennas and radios may be implemented in devices such as smart phones, tablets, and other devices that may communicate wirelessly. The one or more antennas may operate at one or more radio frequencies suitable to send and receive data over cellular networks, Wi-Fi networks, commercial device networks such as a Bluetooth device, and other radio frequency networks. The devices may include one or more radio transmitters and receivers for processing signals sent and received using the antennas.

The components contained in the computer system 1500 of FIG. 15 are those typically found in computer systems that may be suitable for use with embodiments of the present invention and are intended to represent a broad category of such computer components that are well known in the art. Thus, the computer system 1500 of FIG. 15 can be a personal computer, handheld computing device, smart phone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Android, as well as languages including Java, .NET, C, C++, Node.JS, and other suitable languages.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for managing a pipeline for testing an application, the method comprising:

creating a graphical representation of a plurality of stages of a first pipeline provided in a graphical interface, wherein a stage of the plurality of stages includes a plurality of steps and wherein a step of the plurality of steps includes one or more commands;

creating an input set by setting one or more environmental attributes for each stage of the plurality of stages of the first pipeline, wherein the one or more environmental attributes are received as runtime data during execution of the first pipeline;

setting one or more pipeline step attributes to be received as runtime data at runtime for the first pipeline, wherein the one or more pipeline step attributes is associated with a step of the plurality of steps;

initiating execution of the first pipeline;

detecting one or more input sets associated with the first pipeline to be executed;

selecting the created input set of from the one or more input sets in response to initiating the execution of the first pipeline;

receiving the created input set;

binding the created input set to the first pipeline, wherein the binding sets the one or more environmental attributes for each stage of the plurality of stages of the first pipeline and further sets the one or more pipeline step attributes to be received as runtime data at runtime; and executing the first pipeline with the created input set, wherein the first pipeline attributes receiving a value at runtime receive a corresponding value contained within the created input set.

2. The method of claim 1, wherein the graphical representation includes graphical elements for each of one or more first pipeline stages and each of one or more graphical elements for each of the one or more first pipeline stages.

3. The method of claim 1, wherein setting one or more pipeline step attributes includes:

selecting an attribute associated with the first pipeline through the graphical interface;

setting the attribute to be received as an input upon execution of the first pipeline; and saving the attribute as part of the created input set.

4. The method of claim 3, wherein the attribute is associated with environment data.

5. The method of claim 3, wherein the attribute is associated with a step for a first pipeline stage.

6. The method of claim 1, wherein the one or more input sets includes:

a first input set associated with the first pipeline; and a second input set associated with the first pipeline.

7. The method of claim 6, wherein the first input set is associated with a plurality of pipelines, the plurality of pipelines including the first pipeline, and the second input associated exclusively with the first pipeline.

8. The method of claim 1, wherein the graphical interface is a dashboard.

9. A non-transitory computer readable storage medium having embodied thereon a program, the program being executable by a processor to perform a method managing a pipeline for testing an application, the method comprising:

creating a graphical representation of a plurality of stages of a first pipeline provided in a graphical interface, wherein a stage of the plurality of stages includes a plurality of steps and wherein a step of the plurality of steps includes one or more commands;

creating an input set by setting one or more environmental attributes for each stage of the plurality of stages of the first pipeline, wherein the one or more environmental attributes are received as runtime data during execution of the first pipeline;

setting one or more pipeline step attributes to be received as runtime data at runtime for the first pipeline, wherein the one or more pipeline step attributes is associated with a step of the plurality of steps;

initiating execution of the first pipeline;

detecting one or more input sets associated with the first pipeline to be executed;

selecting the created input set from the one or more input sets in response to initiating the execution of the first pipeline;

receiving the created input set;

binding the created input set to the first pipeline, wherein the binding sets the one or more environmental attributes for each stage of the plurality of stages of the first pipeline and further sets the one or more pipeline step attributes to be received as runtime data at runtime; and executing the first pipeline with the created input set, wherein the first pipeline attributes receiving a value at runtime receive a corresponding value contained within the created input set.

10. The non-transitory computer readable storage medium of claim 9, wherein the graphical representation includes graphical elements for each of one or more first pipeline stages and each of one or more graphical elements for each of the one or more first pipeline stages.

11. The non-transitory computer readable storage medium of claim 9, wherein setting one or more pipeline step attributes includes:

selecting an attribute associated with the first pipeline through the graphical interface;

setting the attribute to be received as an input upon execution of the first pipeline; and saving the attribute as part of the created input set.

12. The non-transitory computer readable storage medium of claim 11, wherein the attribute is associated with environment data.

13. The non-transitory computer readable storage medium of claim 11, wherein the attribute is associated with a step for a first pipeline stage.

14. The non-transitory computer readable storage medium of claim 9, wherein the one or more input sets includes:

a first input set associated with the first pipeline; and a second input set associated with the first pipeline.

15. The non-transitory computer readable storage medium of claim 14, wherein the first input set is associated with a plurality of pipelines, the plurality of pipelines including the first pipeline, and the second input associated exclusively with the first pipeline.

16. The non-transitory computer readable storage medium of claim 9, wherein the graphical interface is a dashboard.

17. A system for automatically testing software code, comprising:

a server including a memory and a processor; and one or more modules stored in the memory and executed by the processor to:

create a graphical representation of a plurality of stages of a first pipeline provided in a graphical interface, wherein a stage of the plurality of stages includes a plurality of steps and wherein a step of the plurality of steps includes one or more commands, create an input set by setting one or more environmental attributes for each stage of the plurality of stages of the first pipeline, wherein the one or more environmental attributes are received as runtime data during execution of for the first pipeline, set one or more pipeline step attributes to be received as runtime data at runtime for the first pipeline, wherein the one or more pipeline step attributes is associated with a step of the plurality of steps, initiate execution of the first pipeline, detect one or more input sets associated with the first pipeline to be executed, select the created input set of from the one or more input sets in response to initiating the execution of the first pipeline, receive the created input set, bind the created input set to the first pipeline, wherein the binding sets the one or more environmental attributes for each stage of the plurality of stages of the first pipeline and further sets the one or more pipeline step attributes to be received as runtime data at runtime, and execute the first pipeline with the created input set, wherein the first pipeline attributes receiving a value at runtime receive a corresponding value contained within the created input set.

18. The system of claim 17, wherein the modules are further executable to select an attribute associated with a first pipeline through the graphical interface, set the attribute to be received as an input upon execution of the first pipeline, and save the attribute as part of an input set.

\* \* \* \* \*